United States Patent [19]

Stewart

[11] 3,860,757

[45] Jan. 14, 1975

[54] LOWPASS CIRCUIT FOR PHYSICAL PARTY LINE APPLICATIONS IN SUBSCRIBER CARRIER TELEPHONE SYSTEM

[75] Inventor: James A. Stewart, Menlo Park, Calif.

[73] Assignee: GTE Automatic Electric Laboratories Incorporated, Northlake, Ill.

[22] Filed: June 25, 1973

[21] Appl. No.: 373,060

[52] U.S. Cl. .............................................. 179/2.5 A

[51] Int. Cl. ............................................ H04h 1/08

[58] Field of Search .......... 179/2.5 A; 333/7 D, 7 R, 333/70 R, 76

[56] References Cited

UNITED STATES PATENTS 3,076,871 2/1963 Bauman .......................... 179/2.5 A

*Primary Examiner*—David L. Stewart

*Attorney, Agent, or Firm*—Leonard R. Cool; Russell A. Cannon; T. C. Jay, Jr.

[57] ABSTRACT

A physical party line circuit that is connected across a cable pair in a subscriber carrier telephone system includes a lowpass circuit for isolating carrier frequency signals from the physical telephone set. The lowpass isolation circuit here includes a double-section lowpass filter having a narrow passband, e.g., 0–4 kHz, and having an in-band and an out-of-band series resonance across the cable pair port thereof when its other port is terminated by an on-hook telephone set. The parallel combination of a varistor and a shunt capacitor is connected in series between the cable pair and filter for isolating the latter from the cable pair and translating the in-band series resonant frequency of the filter to a frequency that is outside the filter passband when the associated physical telephone is on-hook and the varistor is nonconducting. The shunt capacitor also slows down voltage transitions between operating states of the varistor for reducing noise in the subscriber carrier channel of the system.

10 Claims, 5 Drawing Figures

PATENTED JAN 14 1975 3,860,757

LOWPASS CIRCUIT FOR PHYSICAL PARTY LINE APPLICATIONS IN SUBSCRIBER CARRIER TELEPHONE SYSTEM

BACKGROUND OF THE INVENTION

This invention relates to subscriber carrier telephone systems having multiparty physical subscriber circuits (i.e., a physical party line) and more particularly to an improved lowpass isolation circuit for use in physical party line circuits of a subscriber carrier telephone system.

A typical subscriber carrier telephone system including a physical party line is illustrated in FIG. 1. In such a system, voice frequency signals, carrier frequency signals, and dc supervisory signals are transmitted on the same cable pair 11, 12. A bandpass filter set 24 is connected between the cable pair and each carrier station terminal 25 to pass carrier frequency signals and to block dc and audio frequency signals. Conversely, a lowpass isolation circuit 15 is connected between the cable pair and each physical circuit party line telephone set 16 to pass dc supervisory and audio frequency signals and to block carrier frequency signals. When a physical telephone 16 is off-hook, the associated lowpass circuit 15 is terminated by an impedance having a value substantially equal to the associated characteristic impedance of the circuit 15. When the physical telephone 16 is on-hook, however, the associated circuit 15 is terminated by an impedance that is substantially greater than the associated characteristic impedance of the circuit 15.

The physical party lowpass circuits in prior-art subscriber carrier telephone systems have been both single-section and multisection lowpass filters, although multisection lowpass filters inherently have more stopband attenuation than single-section lowpass filters. When a one or two-section lowpass filter is bridged across the cable pair with the drop side of the filter unterminated (i.e., the associated physical telephone set is on-hook), such a filter looks like a series-resonant circuit having either one or two resonant frequencies, respectively, connected across the cable pair. If one of these series-resonant frequencies is in the voice frequency passband, the unterminated (i.e., on-hook) physical telephone set will cause the associated lowpass filter to bypass this in-band resonant frequency component in voice frequency signals that are on the cable pair and thus distort these voice frequency signals.

In certain subscriber carrier telephone systems, the central office and subscriber carrier station terminal transmit signals at different carrier frequencies, e.g., at 76 kHz and 28 kHz, respectively. In such a system, it is desirable that the lowpass circuit provide a minimum attenuation to voice frequency signals and a large attenuation at both of the carrier frequencies. Also, in a subscriber carrier telephone system employing level coordination of the transmitted central office carrier signal on the level of the received station terminal carrier signal, it is desirable that the lowpass filters have high stopband attenuation. In order to provide the necessarily high attenuation in the stopband of the lowpass circuit to the carrier frequencies at the lowest possible cost, the upper cut-off frequency of the lowpass circuit is made as low as practicable, e.g., 4 kHz. A single-section lowpass filter can be designed with its series-resonant frequency outside the voice frequency passband. The stopband attenuation of such a filter is too low, however, for use in this application. Although both of the series-resonant frequencies of a two-section lowpass filter can be designed to occur outside of the specified 0 – 4 kHz dc and voice frequency passband, e.g., at 5 and 7 kHz, the stopband attenuation of this filter at the 28 and 76 kHz carrier frequencies is only about two-thirds that of a similar two-section lowpass filter having series resonances at for example 2.5 kHz and 5 kHz. Although the 2.5 kHz series-resonant frequency of the latter filter is in the voice frequency passband and will distort voice signals, this filter provides the largest stopband attenuation for a given cut-off frequency of the lowpass filter.

An object of this invention is the provision of an improved lowpass isolation circuit for the physical party line channel of a subscriber carrier telephone system.

SUMMARY OF THE INVENTION

In accordance with this invention, a varistor and a multisection lowpass filter having at least one series inductor and one shunt capacitor in each section and having a series-resonant frequency in its passband when the filter is terminated by an impedance that is much greater than its characteristic impedance are connected in series between the cable pair of a subscriber carrier telephone system and a physical party line telephone therof. The varistor isolates the filter from the cable pair when the current through the varistor is less than a prescribed value. A capacitor connected in shunt with the varistor has a value of capacitance that is selected to cooperate with elements of the filter to shift the in-band series resonant frequency thereof to a resonant frequency in its stopband when the varistor is nonconducting, and to round off the voltage transitions occurring during changes in conduction states of the varistor in response to an applied signal for reducing noise in the carrier channel.

BRIEF DESCRIPTION OF DRAWING

This invention will be more fully understood from the following detailed description thereof taken in conjunction with the drawing in which.

DESCRIPTION OF PREFERRED EMBODIMENTS

Figure 1:
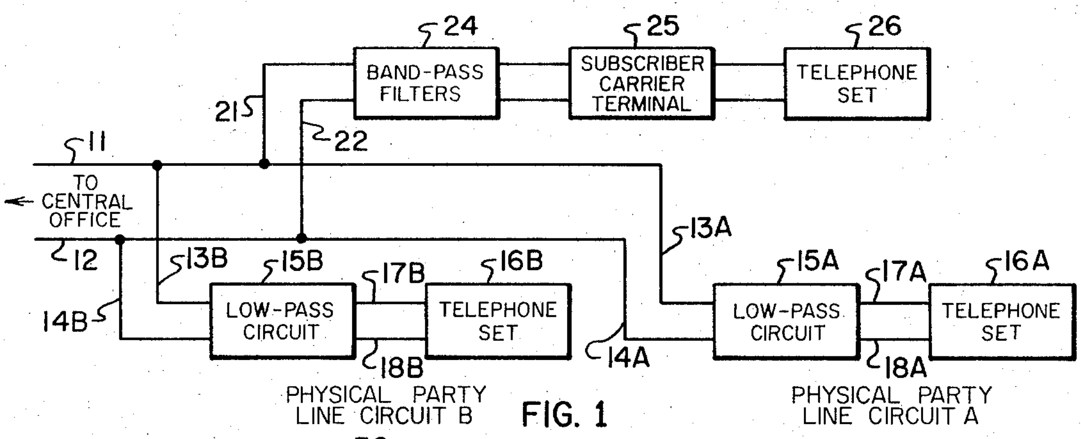
FIG. 1 is a schematic block diagram of a portion of a subscriber carrier telephone system with a physical party line, and embodying this invention.

The subscriber carrier telephone system with a physical party line in FIG. 1 comprises a cable pair 11, 12 having one end connected to a central office (not shown) and having the other end connected through lines 13A and 14A to a first physical party line circuit A including a lowpass circuit 15A and an associated subscriber telephone set 16A. A second physical party line circuit B comprising a lowpass circuit 15B and an associated subscriber telephone set 16B is connected to the cable pair between the central office and circuit A by lines 13B and 14B. A subscriber carrier station comprising bandpass filter set 24, subscriber carrier terminal 25, and associated telephone set 26 is also connected to the cable pair through lines 21 and 22. The filter set 24 for the subscriber carrier station terminal 25 includes transmitter and receiver filters having passbands of for example 24 – 32 kHz and 72 – 80 kHz, respectively.

Figure 2:
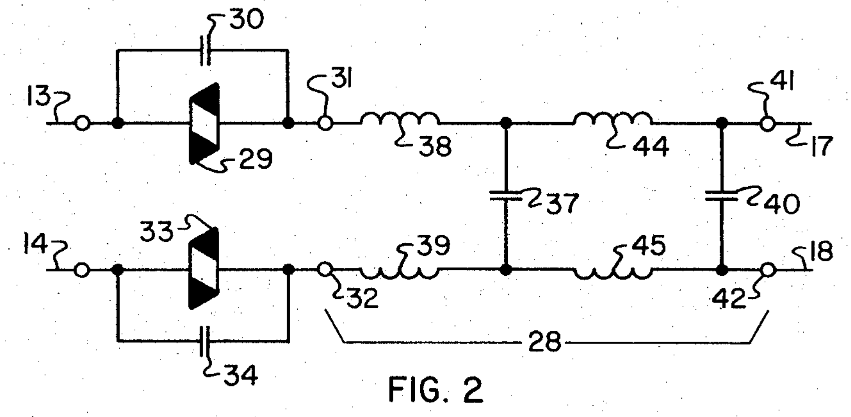
FIG. 2 is a schematic circuit diagram of a lowpass circuit embodying this invention.

Since the lowpass circuits 15A and 15B are identical, these circuits will be described in relation to the common circuit shown in FIG. 2. The elements of the lowpass circuits will be referenced by the suffix letters A and B only when they are identified as being parts of a particular circuit 15A and 15B, respectively. Referring now to FIG. 2, each of the lowpass circuits 15 comprises a two-port, double-section lowpass filter 28. The filter is preferably a balanced circuit for reducing the noise level in the telephone system. The shunt combination of a varistor 29 and capacitor 30 is connected in series between the terminal 31 of one port of filter 28 and line 13. In order to provide a balanced circuit, the parallel combination of a second varistor 33 and shunt capacitor 34 are connected in series between line 14 and the other terminal 32 of the one port of filter 28. The first filter section preferably comprises a shunt capacitor 37 and a pair of inductors 38 and 39 connected in series between different electrodes of capacitor 37 and associated filter terminals 31 and 32 of the one port. The second filter section comprises a shunt capacitor 40 connected across the terminals 41 and 42 of the other port of filter 28, and a pair of inductors 44 and 45 connected in series between different electrodes of the capacitors 37 and 40. An inductor 38 and 39, for example, is employed in each line of the associated filter section in order to provide a balanced circuit. The inductors of each inductor pair 38, 39 and 44, 45 are preferably mutually coupled and wound on the same core for simplicity and economy. When the filter port 41, 42 is terminated in an open circuit, the reactive elements of filter 28 form a series-resonant circuit having two series-resonant frequencies across the one filter port 31, 32.

Although the two filter sections are physically similar, the corresponding values of elements thereof are not necessarily the same. The lowpass filter 28 is preferably designed to have a voice frequency passband of 0 – 4 kHz and high stopband attenuation at the 28 kHz carrier frequency. The stopband attenuation of the filter increases at say 24 *d*B per octave to provide approximately 62 *d*B of isolation to the lower 28 kHz carrier frequency signals and theoretically provide about 100 *d*B isolation to the 76 kHz carrier frequency signals. In order to provide the requisite high stopband attenuation with a 4 kHz cut-off frequency, filter 28 is designed to have an in-band and an out-of-band series resonance across port 31, 32 for example at 2.5 kHz and 5 kHz, respectively, when the filter port 41, 42 is terminated by an impedance having a value that is substantially greater than the characteristic impedance of the filter across the latter port 41, 42. Stated differently, filter 28 looks like a short circuit across the port 31, 32 for a signal applied thereto and having a frequency of 2.5 kHz which is in the filter passband under these conditions.

A varistor is a nonpolarized two-terminal semiconductor device that essentially consists of a pair of parallel connected matched, oppositely poled silicon diodes. It exhibits a symmetrical, nonlinear change in resistance with applied voltage, the impedance and isolation across the varistor decreasing as the applied voltage and current therethrough increase. The varistor is also called a voltage-sensitive resistor that is made of a nonlinear resistance material in which the current varies as a power of the applied voltage.

Figure 3:
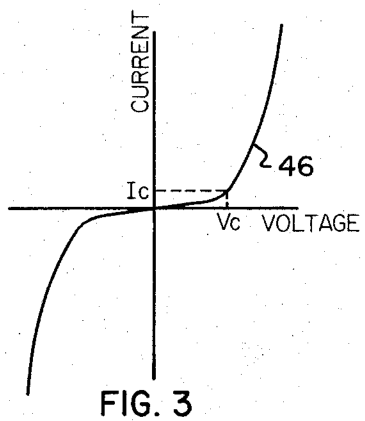
FIG. 3 is a curve useful in explaining the operation of a varistor.

The current-voltage conduction characteristic of a varistor is illustrated in FIG. 3. Although the current through a varistor initially increases only gradually with voltage, it is substantially nonconducting until a voltage of approximately $V_c$ on the knee 46 of the curve is applied thereto to cause a current $I_c$ to flow through the varistor. The current through the varistor increases rapidly for an applied voltage greater than the voltage $V_c$. Thus, a varistor essentially changes operating states form nonconduction to conduction when an applied ac or dc voltage of either polarity exceeds the voltage $V_c$ which may for example be 0.7 volt for a particular varistor device.

In a linear resistance material, $$I = E/R \quad (1)$$

where

R = resistance,

E = voltage across the resistance, and

I = current through the resistance

The operation of a varistor is commonly described by the more general relationship $$I = (E/C)^n = KE^n \quad (2)$$

where

I = instantaneous ac or dc current,

E = instantaneous ac or dc applied voltage

C = a constant (volts at 1 ampere)

K = a constant (amperes at 1 volt), and n = an exponent. The values of the constants K and C depend on the resistivity, geometry, and value of *n* for a particular device. The value of the exponent *n* is a function of the manufacturing process and is normally greater than 3 and may be as high as 7 for high resistivity materials, although *n* is approximately constant for a particular material and device. *n* is 1 for a linear resistor. The larger the value of *n*, the sharper the knee 46 in FIG. 3.

Consider the case where the one filter port 31, 32 is directly connected to lines 13 and 14 (i.e., when the varistors 29 and 33 and associated capacitors 30 and 34 are replaced by short circuits) and the other filter port 41, 42 is connected to a telephone set that is on-hook (i.e., the port 41, 42 is essentially unterminated). In this case, the filter inductors and capacitors form series resonant circuits that are connected across the cable pair. The filter 28 does not have in-band series resonances when the associated telephone 16 is off-hook, i.e., when port 41, 42 is terminated. The 2.5 kHz in-band series resonance of filter 28 with the associated telephone on-hook, however, causes any 2.5 kHz frequency component of a voice frequency signal of one physical circuit on the cable pair to be bypassed by the unterminated lowpass filter 28 of the other physical circuit. This produces a noticeable distortion of the voice signal of the one physical circuit. In accordance with this invention, the varistors 29 and 33 and associated shunt capacitors 30 and 34 reduce the effect of the 2.5 kHz in-band series resonance of filter 28 on voice signals on the cable pair.

When both of the physical subscriber telephone sets 16A and 16B are on-hook, the varistors of the lowpass circuits 15A and 15B are nonconducting to isolate the 2.5 kHz series resonances of the associated filters 28A and 28B from the cable pair. If one physical telephone 16A goes off-hook while the other physical telephone 16B is on-hook, the varistors 29B and 33B of circuit 15B will normally remain nonconducting to isolate the associated filter 28B from the cable pair although the previously nonconducting varistors 29A and 33A of circuit 15A will conduct hard. Since the varistors 29 and 33 are connected in series through the filter capacitors 37 and 40, the nonconducting varistors 29B and 33B of circuit 15B will also isolate the associated filter 28B and its 2.5 kHz in-band series resonance from the cable pair when voice signal voltages on the cable pair and associated with the off-hook telephone 16A are less than approximately 1.4 volts. Only when a voice signal voltage on the cable pair exceeds approximately 1.4 volts will varistors 29B and 33B conduct substantially to connect the 2.5 kHz in-band series resonance of filter 28B to the cable pair. Although a 2.5 kHz voice frequency signal voltage in this instance will be clipped and the reproduced voice somewhat distorted when varistors 29B and 33B conduct under such conditions, this is normally acceptable since a talker seldom speaks loud enough to cause the associated peak-to-peak line voltage to exceed 1.4 volts. Thus, the varistors 29 and 33 effectively isolate the in-band series resonance of filter 28 from the cable pair when normal talking voltages are present, although there may also be a slight increase in the noise level in the subscriber carrier channel.

When the associated physical telephones 16A and 16B are on-hook and off-hook, for example, the off-hook telephone 16B draws between 30 $mA$ and 80 $mA$ of current from the central office battery through the varistors 29B and 33B which are conducting hard. When the off-hook telephone 16B is dialing, it causes the dial contacts (not shown) thereof to periodically open and close. This causes the current through the varistors to abruptly stop and start which causes an abrupt increase and decrease, respectively, in the voltage across the varistors and on the cable pair. This abrupt change in voltage is comprised of a broad spectrum of frequency components, some of which are in the passbands of the filter set 24 in the subscriber carrier channel. These signal components that are in the passbands of filter set 24 increase the noise level in the subscriber carrier channel.

The capacitors 30 and 34 that are connected across associated varistors 29 and 33 essentially bypass high frequency signal components which cause noise in the subscriber carrier channel and are generated in the varistors during changes in the conduction states thereof. The capacitances of these capacitors are preferably large to bypass the undesirable high frequency signal components generated at the varistors and in the passbands of filter set 24. If the net capacitance of capacitors 30 and 34 is much larger than that of capacitors 37 and 40, however, the in-band series resonance will still occur at the same frequency, i.e., the operation of varistors 29 and 33 will be compromised and the isolation provided by the latter will be obviated. The net capacitance of capacitors 30 and 34 is therefore selected to have a value to shift the 2.5 kHz and 5.0 kHz series resonances for example to 5.0 kHz and 7.0 kHz, respectively, so that both of the series resonances occur outside the 0 – 4 kHz passband of filter 28 when the varistors are nonconducting. Thus, the 2.5 kHz series resonance of filter 28 is effectively isolated from the cable pair except during conduction of varistors 29 and 33. A system embodying the circuit in FIG. 2 that was built and tested employed SVI varistors manufactured by Schauer Mfg. Corp., Cincinnati, Ohio. Measurements indicated that the noise level in the carrier channel in this system was approximately 3 dB lower when using the circuit 15 employing both the varistors 29 and 33 and the associated capacitors 30 and 34 than in a circuit 15 employing only the varistors.

Figure 4:
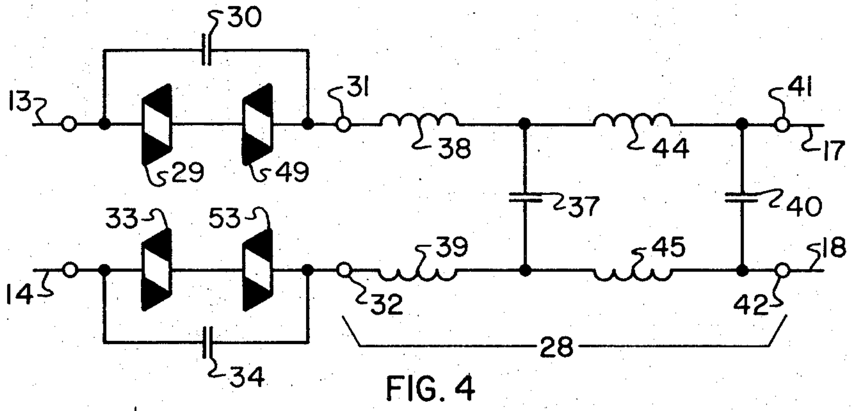
FIG. 4 is a schematic circuit diagram of an alternate embodiment of this invention.

In the modified form of this invention in FIG. 4, a pair of varistors 29, 49 and 33, 53 is connected in series between each of the associated lines 13 and 14 and the associated terminals 31 and 32 of filter 28. In this circuit, the varistors isolate the 2.5 kHz in-band series resonance of filter 28 from the cable pair for talking voltages on the latter of up to for example approximately 2.8 volts.

Figure 5:
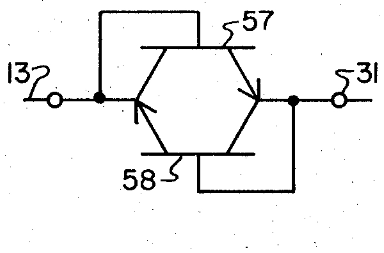
FIG. 5 is a schematic circuit diagram of a pair of transistors that are connected in parallel.

Although this invention has been described with varistors for isolating the lowpass filter 28 from lines 13 and 14, other semiconductor devices may also be employed here. By way of example, the varistors may each be replaced by two pairs of back-to-back Zener and semiconductor diodes that are connected in parallel so that the combination thereof is nonpolarized. Also, each varistor-isolation element may be a pair of semiconductor diodes connected in parallel to be nonpolarized. Alternatively, each of the isolation elements may be a pair of three-terminal transistors 57 and 58, which are connected as shown in FIG. 5.

What is claimed is:

1. A lowpass circuit comprising a first port of the circuit;

a second port of the circuit;

a lowpass filter comprising first and second filter ports and at least two filter sections that are connected in series; each of said filter sections including a first inductor and first capacitor; said inductor of one filter section being connected in series with one terminal of said first filter port; first means connecting said first capacitors of said two filter section across said first filter port through at least said first inductor of said one filter section; second means connecting the other filter section to said second filter port; said filter exhibiting one series resonance across said first filter port at a frequency in the filter passband when said second filter port is terminated by a load having an impedance that is substantially greater than the characteristic impedance at said second filter port;

a nonpolarized semiconductor device that conducts when a voltage across it exceeds a first prescribed value;

third means electrically connecting said semiconductor device in series between the one terminals of said first circuit and first filter ports;

fourth means electrically connecting the other terminals of said first circuit and first filter ports;

fifth means electrically connecting terminals of said second filter port to respective terminals of said second circuit port;

and a second capacitor connected in parallel with said device, said second capacitor having a capacitance for cooperating with the reactive elements of said filter for translating th in-band series resonant frequency of said filter to occur at a frequency outside the filter passband;

said semiconductor device being essentially nonconducting when the current through said device is less than a second prescribed value; said device conducting for electrically connecting said filter to said first circuit port when the current through sald device is greater than the second prescribed value.

2. A lowpass circuit comprising a first port of the circuit;

a second port of the circuit;

a balanced lowpass filter comprising first and second filter ports and at least two filter sections that are connected in series; each of said filter sections including first and second inductors and a first capacitor; said first inductors being connected in series between the one terminals of said filter ports; said second inductors being connected in series between the other terminals of said filter ports; said first capacitors of the one and other of the two filter sections being connected across said first filter port through said inductors of said one filter section and through said inductors of the one and other filter sections, respectively; said filter exhibiting one series resonance across sald first filter port at a frequency in the filter passband when said second filter port is terminated by a load having an impedance that is substantially greater than the characteristic impedance at said second filter port;

first and second nonpolarized semiconductor devices each of which conducts when a voltage across it exceeds a first prescribed value;

first means electrically connecting said first and second semiconductor devices in series between associated terminals of said first circuit port and first filter port;

second means electrically connecting terminals of said second filter port to respective terminals of said second circuit port; and second and third capacitors connected in parallel with said first and second semiconductor devices, respectively, the capacitances of said second and third capacitors having values cooperating with reactive elements of said filter for translating the inband series resonant frequency of said filter to occur at a frequency outside the filter passband;

said semiconductor devices being essentially nonconducting when the current therethrough is less than a second prescribed value; said devices being conducting for electrically connecting said filter to said first circuit port when the current through said devices is greater than the second prescribed value.

3. The circuit according to claim 2 including third and fourth nonpolarized semiconductor devices connected in series with associated first and second devices, said second and third capacitors being connected across the series combinations of said first and third devices and said second and fourth devices, respectively.

4. The circuit according to claim 2 wherein said semiconductor devices are varistors.

5. In a subscriber carrier telephone system with a physical party line having at least a pair of physical telephones separately connected to a cable pair, each physical telephone having a lowpass circuit connected between the cable pair and the associated physical telephone for passing dc and low-frequency voiceband signals and for blocking carrier frequency signals, each of said lowpass circuits comprising a first port of the circuit for connection to the cable pair;

a second port of the circuit for connection to an associated telephone set;

a lowpass filter including first and second filter ports and having at least two sections that are connected in series; each filter section comprising a first inductor and a first capacitor, said first inductors being connected in series between associated one terminals of said filter ports, both of said first capacitors being connected in series across said first filter port through the first inductor of one of said filter sections; and including first means connecting the other associated terminals of said first and second filter ports;

second means connecting associated terminals of the second circuit and second filter ports;

said filter exhibiting a series resonance across said first filter port at a frequency in the filter passband when said second circuit port is terminated in an impedance substantially greater than the filter characteristic impedance at the second filter port by an on-hook telephone;

a nonpolarized semoconductor device that conducts when a voltage across it exceeds a first prescribed value;

third means electrically connecting said semiconductor device in series between associated one terminals of said first circuit and first filter ports;

fourth means connecting the other terminals of said first circuit and first filter ports; and a second capacitor connected in parallel with said device, said second capacitor having a capacitance for cooperating with the reactive elements of said filter for translating the in-band series resonant frequency of said filter to occur at a frequency outside the filter passbnad;

said semiconductor device being nonconducting when the second circuit port is terminated by an on-hook telephone and the voltage on the cable pair is less than the first prescribed value; said device conducting for connecting said filter to said first circuit port when the current through said device is greater than a second prescribed value.

6. In a subscriber carrier telephone system with a physical party line having at least a pair of physical telephones separately connected to a cable pair, each physical telephone having a lowpass circuit connected between the cable pair and the associated physical telephone for passing dc and low-frequency voiceband signals and for blocking carrier frequency signals, each of said lowpass circuits comprising a first port of the circuit for connection to the cable pair;

a second port of the circuit for connection to an associated telephone set;

a balanced lowpass filter including first and second filter ports and having at least two sections that are connected in series; each filter section comprising first and second inductors and a first capacitor; said first inductors being connected in series between associated one terminals of said filter ports; said second inductors being connected in series between associated other terminals of said filter ports; said first capacitors being connected across said first filter port through said inductors of one of said filter sections;

first means connecting associated terminals of the second circuit port and second filter port;

said filter exhibiting a series resonance across said first filter port at a frequency in the filter passband when said second circuit port is terminated in an impedance substantially greater than the filter characteristic impedance at the second filter port by an on-hook telephone;

first and second nonpolarized semiconductor devices each of which conducts when a voltage across it exceeds a first prescribed value;

second means electrically connecting said first and second semiconductor devices in series between associated terminals of said first circuit port and first filter port; and second and third capacitors connected in parallel with said first and second semiconductor devices, respectively, the capacitances of said second and third capacitors having values cooperating with reactive elements of said filter for translating the in-band series resonant frequency of said filter to occur at a frequency outside the filter passband;

said semiconductor devices being essentially nonconducting when the second circuit port is terminated by an on-hook telephone and the voltage on the cable pair is less than the first prescribed value; said devices being conducting for connecting said filter to said first circuit port when the current through said devices is greater than a second prescribed value.

7. The circuit according to claim 6 including third and fourth nonpolarized semiconductor devices connected in series with associated first and second devices, said second and third capacitors being connected across the series combinations of said first and third devices and said second and fourth devices, respectively.

8. The circuit according to claim 6 wherein said semiconductor devices are varistors.

9. A lowpass circuit comprising a first port of the circuit;

a second port of the circuit;

a lowpass filter comprising first and second filter ports and at least two filter sections that are connected in series; at least one of said filter sections including an inductor and a first capacitor; said inductor of the one filter section being connected between one terminal of said first filter port and one terminal of said second filter port through the other filter section; first means connecting said first capacitor of said one filter section across said first filter port through at least said inductor of said one filter section; said filter exhibiting one series resonance across said first filter port at a frequency in the filter passband when said second filter port is terminated by a load having an impedance that is substantially greater than the characteristic impedance at said second filter port;

a nonpolarized semiconductor device that conducts when a voltage across it exceeds a first prescribed value;

second means electrically connecting said semiconductor device in series between the one terminals of said first circuit port and first filter port;

third means electrically connecting the other terminals of said first circuit port and first filter port;

fourth means electrically connecting terminals of said second filter port to respective terminals of said second circuit port; and a second capacitor connected in parallel with said device, said second capacitor having a capacitance cooperating with the reactive elements of said filter for translating the in-band series resonant frequency of said filter to occur at a frequency outside the filter passband;

said semiconductor device being essentially nonconducting when the current through said device is less than a second prescribed value; said device conducting for electrically connecting said filter to said first circuit port when the current through said device is greater than the second prescribed value.

10. In a subscriber carrier telephone system with a physical party line having at least a pair of physical telephones separately connected to a cable pair, each physical telephone having a lowpass circuit connected between the cable pair and the associated physical telephone for passing dc and low-frequency voiceband signals and for blocking carrier frequency signals, each of said lowpass circuits comprising a first port of the circuit for connection to the cable pair;

a second port of the circuit for connection to an associated telephone set;

a lowpass filter including first and second filter ports and having at least two sections that are connected in series; at least one of said filter sections comprising an inductor and a first capacitor; said inductor being connected in series between associated one terminals of said filter ports through the other filter section; said first capacitor being connected in series across said first filter port through said inductor;

first means connecting associated terminals of the second circuit and second filter ports;

said filter exhibiting a series resonance across said first filter port at a frequency in the filter passband when said second circuit port is terminated in an impedance substantially greater than the characteristic impedance of the filter at the second filter port by an on-hook telephone;

a nonpolarized semiconductor device that conducts when a voltage across it exceeds a first prescribed value;

second means electrically connecting said semiconductor device in series between associated one terminals of said first circuit and first filter ports;

third means connecting the other terminals of said first circuit and first filter ports; and a second capacitor connected in parallel with said device, said second capacitor having a capacitance cooperating with the reactive elements of said filter for translating the in-band series resonant frequency of said filter to occur at a frequency outside the filter passband;

said semiconductor device being nonconducting when the second circuit port is terminated by an on-hook telephone and the voltage on the cable pair is less than the first prescribed value; said device being conducting for connecting said filter to said first circuit port when the current through said device is greater than a second prescribed value.

* * * * *